United States Patent

Putzler

[11] 3,737,278
[45] June 5, 1973

[54] MOULD CLOSING MEANS

[75] Inventor: Friedrich Putzler, Meinerzhagen/Westphalia, Germany

[73] Assignee: Battenfeld Maschinenfabriken G.m.b.H., Meinerzhagen, Germany

[22] Filed: Jan. 13, 1972

[21] Appl. No.: 217,564

[30] Foreign Application Priority Data

Feb. 25, 1971  Germany............P 21 09 598.7

[52] U.S. Cl. ..................425/450, 425/242, 164/303
[51] Int. Cl. ..............................................B29f 1/06
[58] Field of Search..........................425/450, 242

[56] References Cited

UNITED STATES PATENTS 3,699,593  6/1972  Cyriax..............................425/450 X
3,687,590  8/1972  Cyriax..............................425/450 X

FOREIGN PATENTS OR APPLICATIONS

D1,127,069  4/1962  Germany..........................425/242

Primary Examiner—J. Howard Flint, Jr.
Attorney—Irvin S. Thompson and Robert J. Patch

[57] ABSTRACT

A mould closing means, in particular for die-casting and injection moulding machines for metals and synthetic materials, having a fixed mould support plate received on pillars, a fixed end plate and a mould support plate, which can be moved between the latter from the open into the closed position, by means of at least two piston-cylinder arrangements engaging the fixed mould support plate or the end plate, a pressure element serving to produce the closing pressure being secured to the end plate, and a pressure plate being located thereon which can be swung from the engaged position between the pressure element and movable mould support plate, about a pillar, into a disengaged position, which is mounted to move axially and which can be infinitely adjusted to various lengths, which is characterized in that the swinging lever supporting the pressure plate is received on the pillar in a pivot bearing fixed in axial direction, and the pressure plate is received in the swinging lever so as to be axially movable against the action of springs, the travel of the springs being smaller than the stroke of the pressure element.

5 Claims, 5 Drawing Figures

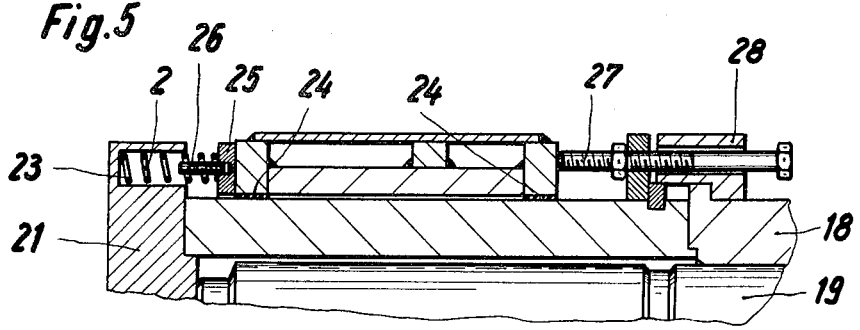
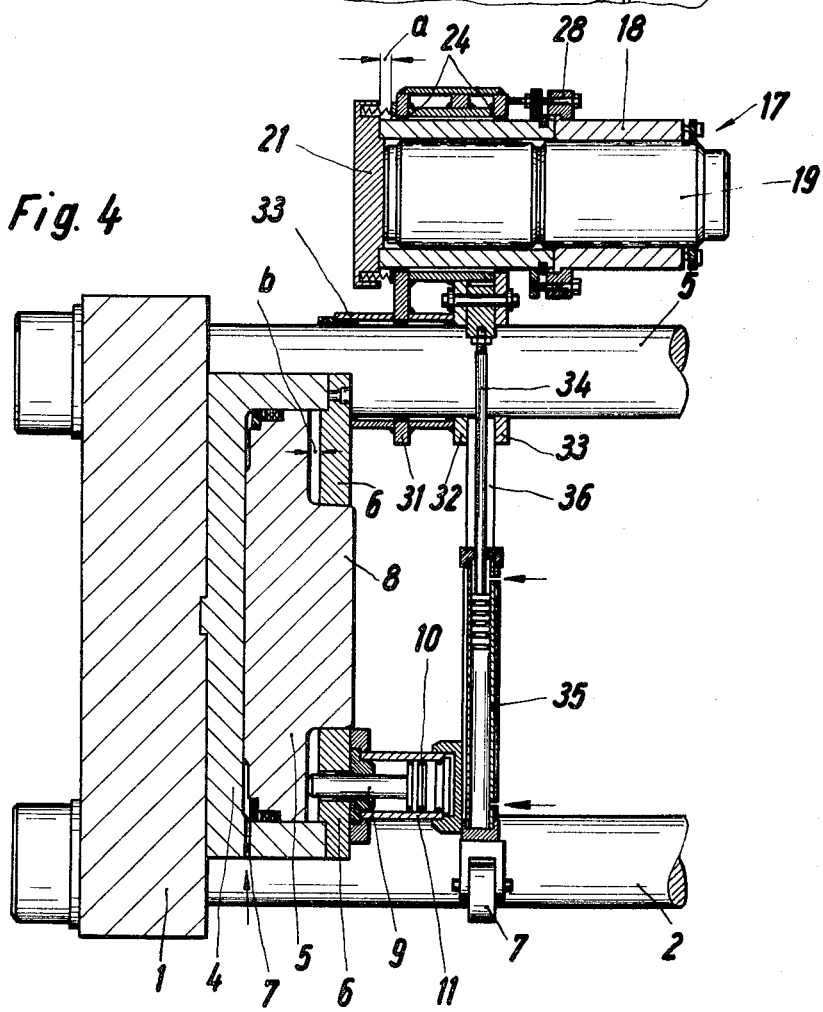

MOULD CLOSING MEANS

The invention relates to a mould closing means, in particular for die-casting and injection moulding machines for metals and synthetic materials.

Such die-casting and injection moulding machines have a fixed mould support plate received on pillars, a fixed end plate, and between the latter at least two piston-cylinder arrangements engaging the fixed mould support plate or the end plate, which arrangements move the movable mould support plate from an open to a closed position. A pressure element, serving to produce the closing pressure, is secured to the end plate. One such known embodiment, according to U.S. Pat. No. 1,127,069, shows a pressure plate, which can be swung from the engaged position between the pressure element and the movable mould support plate, about a pillar, into a disengaged position, which is mounted to move axially and which can be infinitely adjusted to various lengths. In this known embodiment, the pressure plate is secured to an arm which is mounted both to pivot on the pillar and also to move along it.

This known embodiment has considerable disadvantages, in so far as it does not reliably guarantee an efficient swinging in and out of the pressure plate. In order to obtain an efficient swinging, it is necessary that, at the time of both swinging in and out of the pressure plate, there must be a gap with respect to both the pressure element and also the movable mould support plate. If the mould is to be opened, then the pressure element is relieved and returns to its starting position. In the known embodiment the pressure plate, however, abuts against the movable mould support plate, without a gap inevitably forming between the latter and the pressure plate. When the pressure plate is again swung in, the latter can therefore abut the movable mould support plate guided again into the closed position, due to which, there then results disturbance in operation and damage to the pressure plate and movable mould support plate. A further disadvantage consists in that at the time of actuating the pressure element and at the time of the axial movement, occurring due to this, of the arm supporting the pressure plate on the pillar, a tilting of this bearing may occur, which leads to a damaging of the bearing face and thus a loosening of the bearing, due to which the exact maintenance of the swinging plane of the pressure plate lying at right angles to the pillar is not guaranteed. The swinging plane, in particular after a longer period of operation is tilted towards the movable mould support plate. Since there is no gap between the movable mould support plate and the pressure plate, when the pressure plate is swung out, in the case of such a displacement of the swinging plane, an impact of the front end of the pressure plate on the mould plate is immediately possible when it is again swung in.

The invention originates from the above-described known mould closing means, its object is based on forming and disposing the pressure plate, to avoid the disadvantages peculiar to the known embodiment, in such a manner that an efficient swinging in and out is ensured whilst maintaining a gap which is positively adjusted between the pressure plate, and both the movable mould support plate and also the pressure element.

This object is fulfilled according to the invention in that the swinging arm, supporting the pressure plate, is received on the pillar in a pivot bearing fixed in axial direction, and the pressure plate is received in the swinging lever so as to be axially movable against the action of the springs, the travel of the springs being smaller than the stroke of the pressure element. Due to the axially fixed arrangement of the swinging lever on the pillar the same swinging plane is already reliably maintained; the pressure plate itself is mounted to move axially in the swinging lever, the axial movement of the pressure plate occurring in the swinging lever against the action of a pressure spring, the spring travel of which is smaller than the stroke of the pressure element. When the pressure element is relieved and it returns to its starting position, the pressure plate is removed, at the same time, from the movable mould support plate, by the action of its pressure spring. Since the spring travel of the pressure springs is smaller than the stroke of the piston of the pressure element, there inevitably arises a gap between the movable plate and the pressure plate and likewise between the pressure plate and the pressure element. Thus, due to the arrangement and formation, according to the invention, of the pressure plate and swinging lever, an efficient and undisturbed swinging in and out of the pressure plate is guaranteed in very long periods of operation.

A further feature of the invention consists in that the travel of the spring may be adjusted by adjustable stops disposed on the pressure plate. Due to the adjustability, according to the invention, of the travel of the spring, adaptation to each working condition is achieved.

A further feature of the invention is characterized in that the swinging lever consists of several, preferably three bars, spaced apart parallel to each other, which support at one end a sleeve serving as a pivot bearing and secured on the pillar against axial movement, and at the other end are formed as bearing sleeves receiving the pressure plate.

Moreover, the invention is characterized in that the pressure plate, consisting of a threaded sleeve and a die, received in the latter, and provided with external threads, has at the end of the sleeve facing the pressure element a plate overlapping its diameter, which plate is provided, on its periphery with pressure springs abutting against the adjacent side face of the bearing sleeve of the swinging lever, and in that the threaded sleeve is provided with stops abutting the other side face of the bearing sleeve of the swinging lever and formed as screws.

Moreover, it is important that a support embracing the pillar supporting the swinging lever and secured to the pillar adjacent thereto is located between two bars of the swinging lever, on the end whereof remote from the swinging lever, a piston-cylinder arrangement is pivoted, the piston of which engages the swinging lever in its approximately center region.

The support may also be dispensed with and the piston-cylinder arrangement may be received directly on the pillar. Other constructional modifications may also be made under the assumption that they remain within the frame of the basic principle of the invention.

The accompanying drawings shown by way of example, an embodiment of the invention.

FIG. 3 is a view according to FIG. 2 with the pressure plate swung in;

FIG. 4 is a section on the line C—C through the pressure plate and its actuating means and on the line D—D through the pressure element according to FIG. 1;

FIG. 5 is an enlarged partial sectional view of the pressure plate according to FIG. 4.

Figure 1:
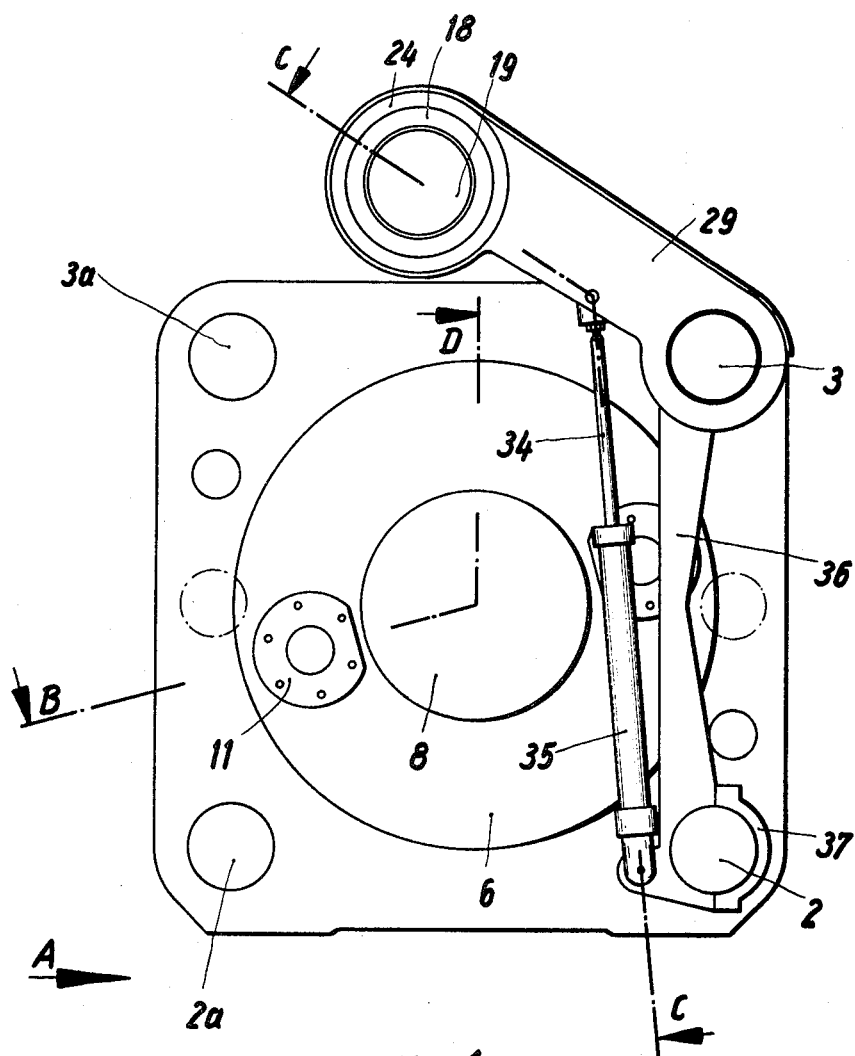
FIG. 1 is a plan view on the pressure plate and the fixed end plate with the movable mould support plate omitted.

The figures show the rear part of a die-casting and injection moulding machine, having mould closing means. The fixed end plate 1 is secured to the pillars 2,3 and 2a, 3a. There is shown on the pillars the movable mould support plate, which, according to FIG. 3 consists of plates 12, 13 which are firmly connected to each other by bars 14, piston-cylinder arrangements 15, 16 have their cylinders 15 secured to the end plate 1, whilst the pistons 16 engage the plate 13 of the movable mould support plate 12,13. There is secured on the surface of the end plate 1, facing the movable mould support plate 12,13 the cylinder 4 of the pressure element, in which the piston 5 is received. The cylinder 4 of the pressure element is closed by means of the closing plate 6, through which the cylindrical projection 8 of the cylinder 5 extends. A transverse bore 7 is provided in the cylinder 4 of the pressure element for conveying the oil. A housing 11 is secured on the closing plate 6, in which housing any known resetting means 9, 10 e.g. piston-cylinder arrangement, is located, through which the closing plate 6 projects and lies on the surface of the piston 5. When the pressure element has been relieved, a resetting of the piston 5 of the pressure element is effected, by the action of the resetting means 9, 10 into the starting position according to FIG. 4.

The pressure plate 17 consists of a threaded sleeve 18 and a die 19, received in the latter, and provided with external threads, for infinitely adjusting the length of the pressure plate. A counter die 20 is situated on the rear side of the plate 12, with which counter die the pressure plate 17 engages in the swung-in position.

The threaded sleeve 18 is provided with a closing plate 21 on its end facing the pressure element 4, 5, 6 the diameter of which plate is greater than the diameter of the threaded sleeve 18 of the pressure plate 17. On the periphery of the closing plate 21, pressure springs 22 are received in corresponding recesses 23 of the closing plate 21. The pressure plate 17 is mounted to move axially in a bearing sleeve 24, which is secured to the end of the swinging lever 29. The bearing sleeve 24 has, on its end facing the closing plate 21, a cover plate 25, in which a guide pin 26 is secured engaging in the end of the springs 22. There is received on the threaded sleeve 18, in a ring 28, an adjusting screw 27, which abuts the end of the bearing sleeve 24 opposite to the plate 25 and allows an adjustment of the possible travel of the springs 22. As is shown in FIG. 4, the possible travel $a$ of the spring is smaller than the stroke $b$ of the pressure element 4,5,6.

The swinging lever 29 consists of three bars 30, 31 and 32, parallel to each other, which support at their one end the bearing sleeve 24 for the pressure plate 17 and at their other end form a pivot bearing 33, which is located on the pillar 3 fixed in axial direction.

The swinging movement of the swinging lever is effected by the piston-cylinder arrangement 34, 35. The piston 34 is, as is shown in FIGS. 1 and 4, pivoted in the region of the center of the swinging lever 29 between the bars 31,32. Moreover, a support 36 is located on the pillars 2 and 3, which support embraces the pillar 3 and is secured to the pillar 2 by means of a clamping collar 37. The cylinder 35 is hinged on the end of the support 36 secured to the pillar 2.

Figure 2:
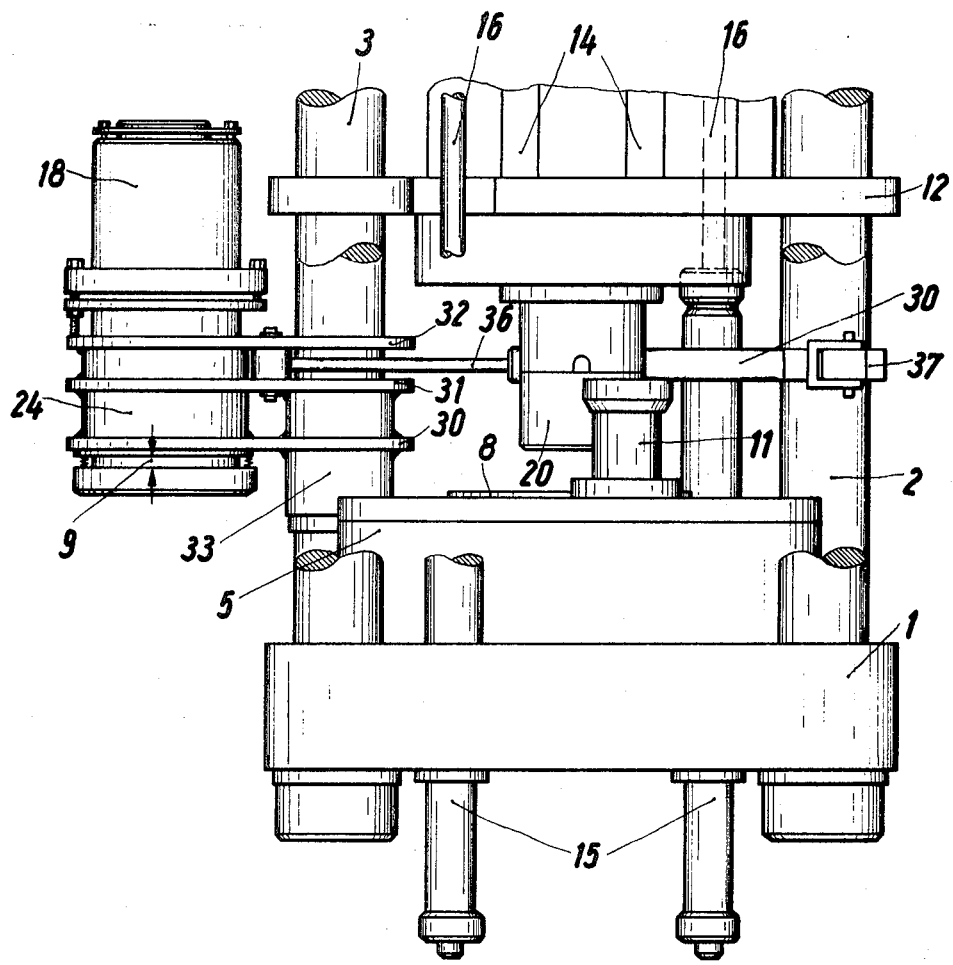
FIG. 2 is a view in the direction of arrow A of FIG. 1, with the pressure plate swung out.
Figure 3:
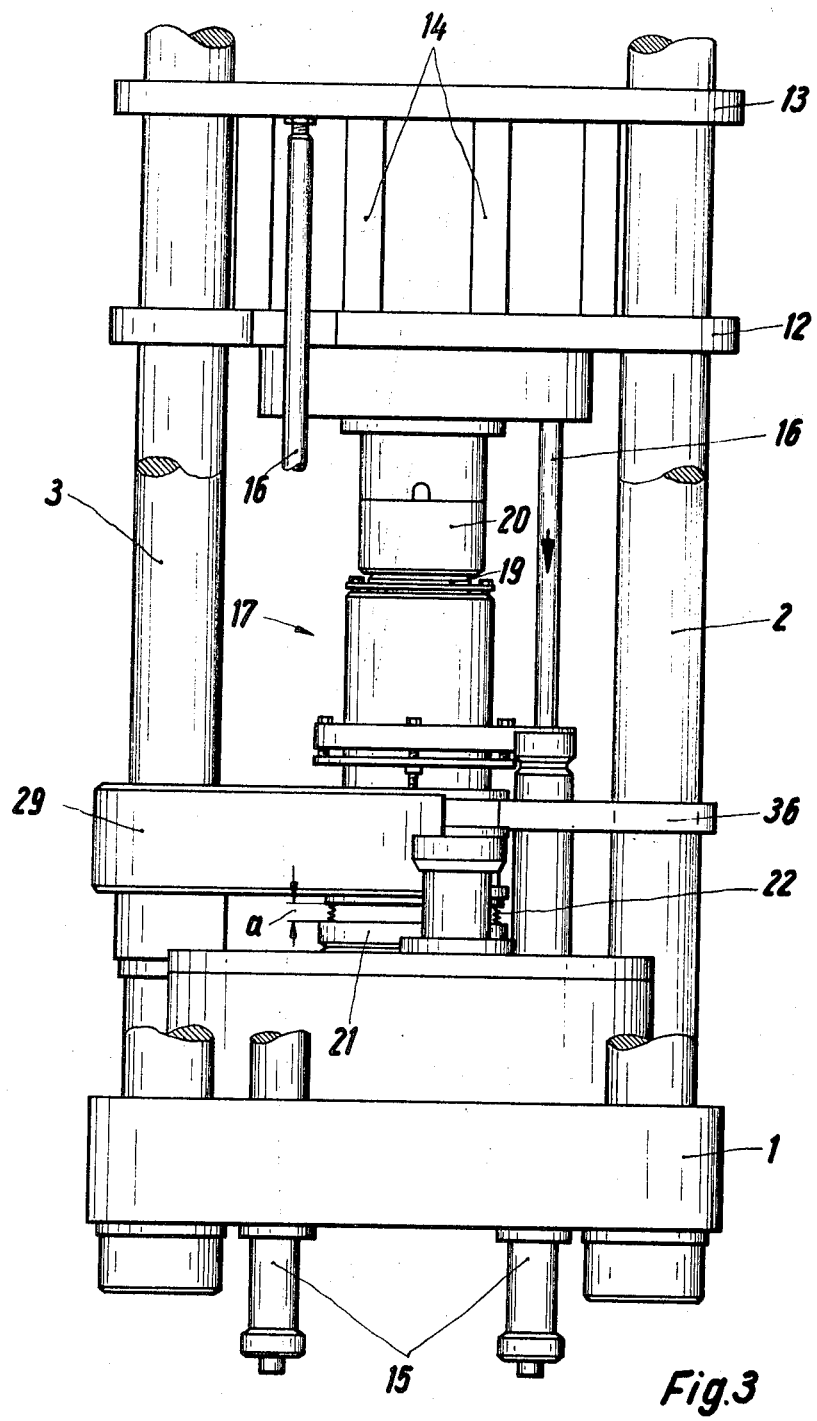

The mould closing means operates as follows when the pressure plate 17, as is shown in FIG. 3, is situated in the swung-in position, and when the pressure element 4,5,6 is under pressure for the production of the closing pressure, the front end of the pressure plate 17 engages with the counter die 20 of the movable mould support plate 12,13 and the other end of the pressure plate 17 engages with the cylindrical projection 8 of the cylinder 5 of the pressure element. If the mould, which is not shown in the drawings, is to be opened, then the pressure element 4,5,6 is relieved; it returns, by the action of the resetting means 9,10 according to FIG. 4 into its starting position. At this time, the pressure springs 22 located on the pressure plate, are actuated, which pressure springs remove the pressure plate from the pressure die. Since the travel $a$ of the springs 22 is smaller than the stroke $b$ of the pressure element 4,5,6, the pressure plate 17 is moved backwards by the springs 22 in the bearing sleeve 24 of the swinging lever 29 in such a manner that a gap inevitably occurs between the front side of the pressure plate 17 and the counter die 20 and also a gap occurs between the closing plate 21 of the pressure plate 17 and the cylindrical projection 8 of the piston 5 of the pressure element. Due to the actuation of the piston-cylinder arrangement, which abuts the support 36, the swinging lever 29 is swung out with the pressure plate, the swinging lever pivoting in the pivot bearing 33 about the pillar 3, without undergoing any axial adjustment. Depending on the swinging out obtained by the pressure plate 17 with the swinging lever 29, the movable mould support plate 12, 13 with the mould half movable on it, is conveyed in the direction of the arrow shown in FIG. 3 into the position shown in FIG. 2 by the piston-cylinder arrangement 15, 16. At the time of a subsequent support operation, the movable mould support plate is then conveyed from the position shown in FIG. 2 to the position shown in FIG. 3 by the contrary actuation of the piston-cylinder arrangement 15,16, whereupon the swinging lever 29 is swung in with the pressure plate 17 from the position shown in FIG. 2 to the position shown in FIG. 3, by the corresponding actuation of the piston-cylinder arrangement 34,35 a gap inevitably arising between the pressure plate and the counter die 20 and the pressure plate and the pressure element 4,5,6 before the pressure element is put under pressure.

What is claimed is:

1. Mould closing means, in particular for die-casting and injection moulding machines for metals and synthetic materials, having a fixed mould support plate received on pillars, a fixed end plate and a mould support plate, which can be moved between the latter from the open into the closed position, by means of at least two piston-cylinder arrangements engaging the fixed mould support plate or the end plate, a pressure element serving to produce the closing pressure being secured to the end plate, and a pressure plate being located thereon which can be swung from the engaged position between the pressure element and movable mould support plate, about a pillar, into a disengaged position, which is mounted to move axially and which can be infinitely adjusted to various lengths, characterized in that the swinging lever supporting the pressure plate is received on the pillar in a pivot bearing fixed in axial direction, and the pressure plate is received in the swinging lever so as to be axially movable against the action of springs, the travel of the springs being smaller than the stroke of the pressure element.

2. Mould closing means according to claim 1, characterized in that the travel of the spring can be adjusted by adjustable stops located on the pressure plate.

3. Mould closing means according to claim 1, characterized in that the swinging lever consists of several, preferably three bars spaced apart parallel to each other, which support at one end a sleeve serving as pivot bearing and secured on the pillar against axial movement and at the other end are formed as bearing sleeves receiving the pressure plate.

4. Mould closing means according to claims 1, characterized in that the pressure plate, consisting of a threaded sleeve and a die received in the latter and provided with external threads, has on the end of the sleeve facing the pressure element a plate overlapping its diameter which plate is provided, on the periphery, with pressure springs abutting against the adjacent side face of the bearing sleeve of the swinging lever and in that the threaded sleeve is provided with stops abutting the other side face, of the bearing sleeve of the swinging lever and formed as screws.

5. Mould closing means according to claims 1, characterized in that a support embracing the pillar supporting the swinging lever and secured to the pillar, adjacent thereto is located between two bars of the swinging lever, on the end whereof remote from the swinging lever, a piston-cylinder arrangement is pivoted, the piston of which engages the swinging lever in its approximately center region.

* * * * *